US012774729B2

(12) United States Patent
Xing et al.

(10) Patent No.: US 12,774,729 B2
(45) Date of Patent: Oct. 27, 2026

(54) METHODS AND APPARATUS TO DYNAMICALLY DETERMINE BRAKE PAD WEAR

(71) Applicant: Ford Global Technologies, LLC, Dearborn, MI (US)

(72) Inventors: Yun Xing, Canton, MI (US); John Erik Mikael Hellstrom, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 574 days.

(21) Appl. No.: 18/364,456

(22) Filed: Aug. 2, 2023

(65) Prior Publication Data

US 2023/0375060 A1 Nov. 23, 2023

Related U.S. Application Data

(63) Continuation of application No. 17/177,907, filed on Feb. 17, 2021, now Pat. No. 11,754,135.

(51) Int. Cl.

*F16D 66/02* (2006.01)
*B60T 17/22* (2006.01)
*F16D 121/04* (2012.01)

(52) U.S. Cl.

CPC .......... *F16D 66/023* (2013.01); *B60T 17/225* (2013.01); *F16D 66/026* (2013.01); (Continued)

(58) Field of Classification Search

CPC ...... F16D 66/02; F16D 66/021; F16D 66/023; F16D 66/026; F16D 66/027

(Continued)

(56) References Cited

U.S. PATENT DOCUMENTS 5,116,109 A * 5/1992 Kuwana .................. B60T 8/348 188/181 C
5,470,134 A 11/1995 Toepfer et al.
(Continued)

FOREIGN PATENT DOCUMENTS

DE 3313078 C2 6/1991
DE 102016215725 A1 * 2/2018 ........... F16D 66/021
(Continued)

OTHER PUBLICATIONS

Zhang et al, "Simulation Study on Friction and Wear Law of Brake Pad in High-Power Disc Brake," indawi, Mathematical Problems in Engineering, vol. 2019, Article ID 6250694, https://doi rg/10.1155/2019/6250694, published Jul. 14, 2019, 16 pages.
(Continued)

*Primary Examiner* — Thomas J Williams

(74) *Attorney, Agent, or Firm* — Lorne Forsythe; Hanley, Flight & Zimmerman, LLC

(57) ABSTRACT

Methods and apparatus to sense brake pad wear are disclosed. An example apparatus includes at least one memory device and at least one processor to execute instructions to determine whether a braking event corresponds to an anti-lock braking event or a non-anti-lock braking event, in response to the braking event corresponding to the anti-lock braking event, determine at least one of a thickness of a brake pad or a wear of the brake pad based on at least operating parameters of a motor associated with pumping a brake fluid, and in response to the braking event corresponding to the non-anti-lock braking event, determine at least one of the thickness or the wear based on at least a first measurement from a rotary sensor operatively coupled to a brake rotor and a second measurement from a pressure sensor operatively coupled to a flow path of the brake fluid.

17 Claims, 8 Drawing Sheets

(52) U.S. Cl.
CPC ...... *F16D 2121/04* (2013.01); *F16D 2300/18* (2013.01); *F16D 2300/20* (2021.01)

(58) Field of Classification Search
USPC ............................ 188/1.11 W, 1.11 L, 1.11 E
See application file for complete search history.

(56) References Cited

U.S. PATENT DOCUMENTS

| | | | | |
|---|---|---|---|---|
| 6,707,183 | B2 | 3/2004 | Breynaert et al. | |
| 11,754,135 | B2 | 9/2023 | Xing et al. | |
| 2017/0120884 | A1 | 5/2017 | Mate et al. | |
| 2018/0141534 | A1* | 5/2018 | Prehofer | B60T 17/228 |
| 2019/0084548 | A1 | 3/2019 | Ohazulike | |
| 2021/0277971 | A1* | 9/2021 | Marmara | B60T 17/221 |
| 2022/0260127 | A1 | 8/2022 | Xing et al. | |
| 2023/0375060 | A1* | 11/2023 | Xing | F16D 66/023 |

FOREIGN PATENT DOCUMENTS

| | | | | |
|---|---|---|---|---|
| DE | 102018218567 A1 | | 4/2020 | |
| GB | 2266568 A | * | 11/1993 | F16D 66/021 |
| KR | 100987073 B1 | | 10/2010 | |
| WO | 2019110391 A1 | | 6/2019 | |

OTHER PUBLICATIONS

United States Patent and Trademark Office, "Non-Final Rejection", issued in connection with U.S. Appl. No. 17/177,907, dated Sep. 21, 2022, 9 pages.

United States Patent and Trademark Office, "Final Rejection", issued in connection with U.S. Appl. No. 17/177,907, dated Feb. 16, 2023, 10 pages.

United States Patent and Trademark Office, "Notice of Allowance and Fee(s) Due", issued in connection with U.S. Appl. No. 17/177,907, dated May 2, 2023, 7 pages.

* cited by examiner

METHODS AND APPARATUS TO DYNAMICALLY DETERMINE BRAKE PAD WEAR

RELATED APPLICATION

This patent arises from a continuation of U.S. patent application Ser. No. 17/177,907, which was filed on Feb. 17, 2021. U.S. patent application Ser. No. 17/177,907 is hereby incorporated herein by reference in its entirety. Priority to U.S. patent application Ser. No. 17/177,907 is hereby claimed.

FIELD OF THE DISCLOSURE

This disclosure relates generally to prognostic or diagnostic capabilities of a vehicle and, more particularly, to methods and apparatus to dynamically determine brake pad wear.

BACKGROUND

Braking operations cause brake pads to wear over time, which can affect braking capabilities and/or cause damage to a vehicle. As a result, drivers schedule vehicle maintenance to replace the brake pads and, in turn, prevent damage to the vehicle and reduce a likelihood of non-ideal braking situations.

SUMMARY

Example methods and apparatus to dynamically determine brake pad wear are disclosed herein. An example apparatus disclosed herein includes at least one memory device and at least one processor to execute instructions to, in response to an anti-lock braking system event, determine a volume of brake fluid in a brake piston chamber based on a flow rate of the brake fluid and a pressure within the brake piston chamber, and determine at least one of a thickness of a brake pad or a wear of the brake pad based on the volume of the brake fluid in the brake piston chamber and a volume of the brake piston chamber.

An example method to dynamically determine brake pad wear disclosed herein includes determining, in response to an anti-lock braking event, a volume of a brake fluid in a brake piston chamber based on a flow rate of the brake fluid and a pressure inside the brake piston chamber, and determining at least one of the thickness of a brake pad or the wear of the brake pad based on the volume of the brake fluid in the brake piston chamber and a volume of the brake piston chamber.

An example apparatus to dynamically determine brake pad wear in a vehicle disclosed herein includes a memory, and a brake wear controller to identify a status of a braking event, determine a volume of brake fluid in a brake piston chamber based on a flow rate of the brake fluid and a pressure inside the brake piston chamber, determine at least one of a brake pad thickness or a brake pad wear based on the volume of brake fluid in the brake piston chamber and a volume of the brake piston chamber.

Figure 1:
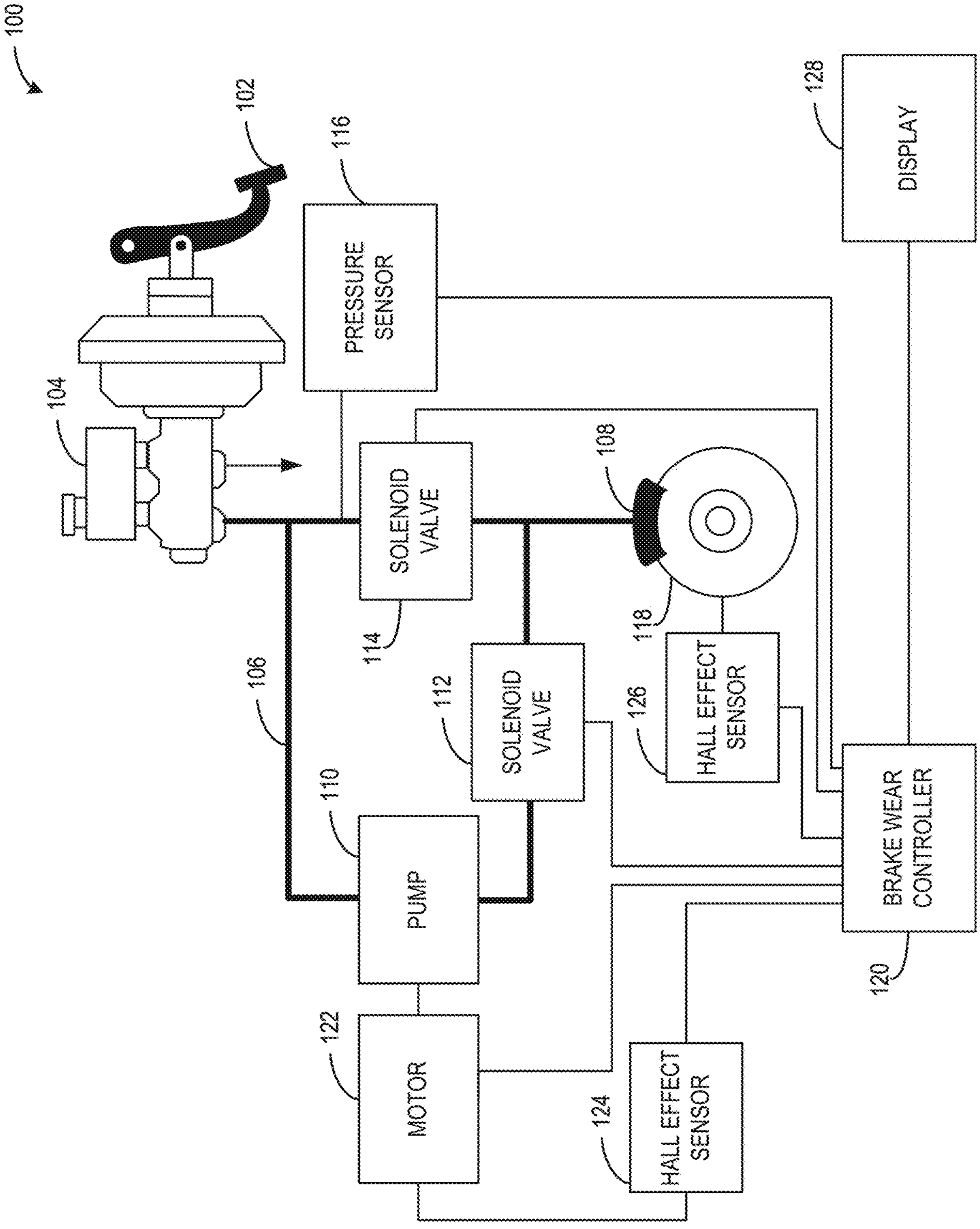
FIG. 1 is a schematic illustration of an example braking system including an example brake wear controller.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example methods and apparatus to dynamically determine brake pad wear. Prognostic and/or diagnostic capabilities of a vehicle provide drivers with a health status of certain components. For example, a check engine light can illuminate to alert the driver of a malfunction in the engine, a tire pressure light can indicate a low air pressure in one or more tires, and/or an oil light can indicate that an oil pressure is low. Such indications can alert the driver that the vehicle is operating irregularly. In turn, the driver can take action to maintain effective functions of the vehicle. Accordingly, the indications enable the driver to avoid an accident and/or irreversible damage that would otherwise result from an irregular condition of the vehicle.

A braking system is essential to the operations of a vehicle and the security of its passengers. As such, it is advantageous for drivers to be aware of a health status of the braking system to ensure that the vehicle can be securely stopped when driving. For example, when a brake pad of the braking system experiences a significant amount of wear, the brake pad can be replaced to avoid ineffective braking operations. In addition, neglecting the brake pad after the brake pad has significant wear can cause irreversible damage to the vehicle. Specifically, a backing plate of the brake pad can contact a brake rotor associated with the braking system when the brake pad is significantly worn, which can damage the rotor and further impact vehicle braking and/or control capabilities. As such, replacing the brake pads proactively (e.g., prior to the brake pads surpassing a threshold degree of wear) can reduce overall maintenance costs and improve the braking capabilities of the vehicle.

Some known braking systems implement electrical contacts within the brake pad or in the associated backing plate. In such braking systems, the electrical contacts trigger a brake pad wear signal when they come into contact with the rotor due to the wear of the brake pad. However, such braking systems add an additional cost to the vehicle as a result of the electrical contacts and other necessary components. Further, such braking systems only determine when the brake pad wear surpasses a predetermined wear based on the position of the electrical contacts. As a result, the driver is unable to anticipate when brake pad maintenance will be necessary. For instance, when brake pad wear surpasses the predetermined wear, the driver may be in the midst of a road trip or any other obligation, which prevents the driver from obtaining timely maintenance to prevent non-ideal braking events and/or damage to the vehicle.

In some instances, a brake pad wear is determined based on a brake fluid volume deviation when a brake fluid pressure corresponds to a predefined pressure value. Consequently, the brake pad wear measurement is strictly limited as the wear can only be determined at a certain brake fluid pressure. In some instances, the brake pad wear is inferred based on a brake fluid volume consumption measurement. However, the brake fluid volume consumption measurement can often be inaccurate as a result of various uncertainties in parameters associated with the braking system.

Examples disclosed herein provide a braking system to dynamically determine a wear of a brake pad in a vehicle. The example braking system utilizes predetermined parameters associated with the components of the braking system and measurements from sensors onboard the vehicle to virtually sense the brake pad wear. The example braking system can alert the driver of the brake pad wear to prevent non-ideal braking situations and/or damage to the vehicle. In turn, the driver can maintain awareness of the health status of the vehicle and schedule vehicle maintenance accordingly, which can reduce overall maintenance costs and improve operations of the vehicle.

An example braking system disclosed herein includes a brake wear controller to dynamically determine the wear of the brake pad in response to braking events. In some examples, the brake wear controller is operatively coupled to sensors, such as one or more Hall effect sensors and/or a pressure sensor. For example, a pressure sensor can be operatively coupled to a flow path of brake fluid in the vehicle to measure a pressure therein. In some examples, a Hall effect sensor is operatively coupled to a motor associated with a pump that controls a flow of the brake fluid. In some examples, a Hall effect sensor is operatively coupled to a brake rotor associated with the brake pad. The sensors can be utilized in any hydraulic braking system. As such, the brake wear controller can be integrated in existing vehicles with minimal costs. In some examples, the brake wear controller is operatively coupled to a display of the vehicle. In such examples, the brake wear controller provides a brake pad wear measurement and/or a status of the brake pad wear to the driver.

The braking system can encounter an anti-lock braking event when a rotation of a brake rotor (e.g., a brake disc, a wheel, etc.) begins to brake faster than expected for the vehicle, which would cause the wheel to lose traction with the driving surface. In some examples, the braking system controls a brake fluid pressure via one or more pumps and/or valves in response to the anti-lock braking event to prevent the wheel from slipping and enable the driver to control the vehicle.

In some examples, in response to encountering the anti-lock braking event, the brake wear controller determines a volume of brake fluid in a brake piston chamber based on a flow rate of the brake fluid and a pressure within the brake piston chamber. In some examples, the brake wear controller determines a thickness of the brake pad and/or a wear of the brake pad based on the volume of brake fluid in the brake piston chamber and a maximum initial volume of the brake piston chamber. In some examples, the brake wear controller determines and/or updates a brake pad wear coefficient based on the thickness and/or the wear of the brake pad. In such examples, the brake pad wear coefficient corresponds to material properties of the brake pad.

In some examples, the brake wear controller determines the flow rate of the brake fluid (e.g., an ingoing or outgoing flow rate relative to the brake piston chamber) based on an angular velocity (e.g., a speed) of the motor that drives the brake fluid pump. In some examples, the brake wear controller determines the angular velocity of the motor based on measurements from the Hall effect sensor operatively coupled to the motor. In some examples, the brake wear controller determines the angular velocity of the motor based on a back electromotive force (EMF) of the motor. For example, the motor generates the back EMF that varies the current through the motor based on a rotational speed of the motor. In turn, the brake wear controller can determine the rotational speed of the motor based on the current associated with the motor.

In some examples, the brake wear controller determines the pressure within the brake piston chamber based on the angular velocity of the motor and a stator current of the motor. For example, the stator current of the motor can correspond to a torque of the motor and, thus, a resistance of the brake fluid being driven by the brake fluid pump. In some examples, the pressure within the brake piston chamber corresponds to the volume of brake fluid in the brake piston chamber and the flow rate of the brake fluid.

In some examples, the brake wear controller adjusts the process by which the brake pad wear is determined in response to a braking event other than an anti-lock braking event (e.g., a non-anti-lock braking event). For example, the brake wear controller can determine the thickness and/or the wear of the brake pad based on the brake pad wear coefficient, a sliding distance of the brake pad relative to the brake rotor, and a contact pressure between the brake pad and the brake rotor during the non-anti-lock braking event. In some examples, the brake wear controller determines a sliding velocity of the brake pad relative to the brake rotor via a rotary sensor operatively coupled to the brake rotor. For example, the rotary sensor can include one or more Hall effect sensors, which the brake wear controller utilizes to determine a rotational velocity of the brake rotor and, thus, the sliding velocity of the brake pad. In some examples, the brake wear controller determines the sliding distance of the brake pad based on the sliding velocity of the brake pad. In some examples, the brake wear controller determines the contact pressure between the brake pad and the brake rotor based on a contact area of the brake pad on the brake rotor and/or a measurement from the pressure sensor operatively coupled to the flow path of the brake fluid.

FIG. 1 is a schematic illustration of an example braking system 100 of a vehicle. In FIG. 1, the braking system 100 includes a brake pedal 102, a brake master cylinder 104, a brake line (e.g., a brake fluid flow path) 106, a brake pad 108, a pump (e.g., a brake fluid pump) 110, a first solenoid valve 112, a second solenoid valve 114, a pressure sensor 116, a brake rotor (e.g., a brake disc) 118, a brake wear controller 120, a motor 122, a first Hall effect sensor 124, a second Hall effect sensor 126, and a display 128.

In FIG. 1, the brake pedal 102 is operatively coupled to the brake master cylinder 104. In FIG. 1, the brake master cylinder 104, the brake pad 108, the pump 110, the first solenoid valve 112, the second solenoid valve 114, and the pressure sensor 116 are operatively coupled to the brake line 106. In FIG. 1, the brake pad 108 is operatively coupled to the brake rotor 118. In FIG. 1, the brake wear controller 120 is operatively coupled to the first solenoid valve 112, the second solenoid valve 114, the pressure sensor 116, the motor 122, the first Hall effect sensor 124, the second Hall effect sensor 126, and the display 128. In some examples, the motor 122 is operatively coupled to the pump 110 and the first Hall effect sensor 124. In some examples, the second Hall effect sensor 126 is operatively coupled to the brake rotor 118.

In FIG. 1, a driver imparts a force on the brake pedal 102 to brake the vehicle. In FIG. 1, the brake master cylinder 104 converts the force on the brake pedal 102 into a hydraulic pressure of brake fluid in the brake line 106. As a result, the hydraulic pressure of the brake fluid causes the brake pad 108 to be urged against the brake rotor 118 and, thus, the brake pad acts against a rotation of the brake rotor 118 via friction, which brakes the vehicle. Although the example braking system 100 disclosed herein is activated by a driver that depresses the brake pedal 102, it should be understood that examples disclosed herein may also be implemented in an autonomous vehicle.

In FIG. 1, the pressure sensor 116 measures a pressure of the brake fluid in the brake line 106. In some examples, the brake wear controller 120 detects that the brake pedal 102 is depressed in response to the pressure sensor 116 indicating a pressure increase in the brake line 106. In FIG. 1, the second Hall effect sensor 126 measures a magnetic flux and, in turn, a magnetic field change of the brake rotor 118. As a result, the brake wear controller 120 can determine an angular velocity and/or acceleration of the brake rotor 118 based on the magnetic flux of the brake rotor 118. In some other examples, an alternative component of the vehicle can indicate the angular velocity and/or acceleration of the brake rotor 118 to the brake wear controller 120, which enables the brake wear controller 120 to detect the braking event.

In FIG. 1, the pump 110, the first solenoid valve 112, and the second solenoid valve 114 control the hydraulic pressure of the brake fluid in the brake line 106. Specifically, the pump 110, the first solenoid valve 112, and the second solenoid valve 114 modulate a hydraulic pressure of the brake fluid in the brake line in response to an anti-lock braking event being triggered. For example, when the brake rotor 118 brakes faster than a predetermined threshold, the second solenoid valve 114 closes to prevent the brake master cylinder 104 from increasing the hydraulic pressure of the brake fluid in a brake piston chamber associated with the brake pad 108. Further, the first solenoid valve 112 can open to enable brake fluid in the brake line 106 to flow away from the brake pad 108. As a result, the first solenoid valve 112 reduces a pressure on the brake pad 108 and, thus, reduces the friction between the brake pad 108 and the brake rotor 118 to reduce braking of the vehicle.

In some examples, the motor 122 drives the pump 110 to control the hydraulic pressure and/or a flow rate of the brake fluid in a brake piston chamber associated with the brake pad 108. In such examples, the motor 122 controls a driving force of the pump 110 to provide a hydraulic pressure to the brake pad 108 that brakes the vehicle while preventing the brake rotor 118 from locking. As a result, the braking system 100 enables the vehicle to maintain traction with the driving surface.

In FIG. 1, the brake wear controller 120 determines whether the braking event is an anti-lock braking event in response to an activation of the motor 122, the first solenoid valve 112 opening, and/or the second solenoid valve 114 closing. In FIG. 1, in response the braking event being an anti-lock braking event, the brake wear controller 120 determines a flow rate of the brake fluid to the brake line 106 based on a pump flow rate equation. In some examples, the pump flow rate equation utilizes a speed of the motor 122 and a predetermined displacement of the pump 110, which corresponds to a volume of brake fluid moved in one pumping cycle. For example, the brake wear controller 120 can determine the speed of the motor 122 based on a back EMF of the motor 122. In some other examples, the brake wear controller 120 determines the speed of the motor 122 based on a magnetic field measurement of the first Hall effect sensor 124.

In some examples, the brake wear controller 120 receives from the motor 122 a signal indicative of a stator current of the motor 122. In FIG. 1, the brake wear controller 120 determines a hydraulic pressure inside a brake piston chamber associated with the brake pad 108 based on a motor torque and current relationship and/or a motor torque load balance equation. In some examples, the hydraulic pressure inside the brake piston chamber is based on the speed of the motor 122 and the stator current of the motor 122.

In FIG. 1, the brake wear controller 120 determines a hydraulic volume of brake fluid in the brake piston chamber based on a relationship between the volume, the hydraulic pressure inside the brake piston chamber, and the flow rate of the brake fluid. In some examples, the volume of brake fluid in the brake piston chamber is based on the flow rate of the brake fluid to the brake line 106 and the pressure inside the brake piston chamber.

In FIG. 1, the brake wear controller 120 determines a thickness and/or a wear of the brake pad 108 based on a relationship between the brake pad thickness and the hydraulic volume of brake fluid in the brake piston chamber. In some examples, the thickness and/or the wear of the brake pad 108 is based on the volume of brake fluid in the brake piston chamber and a volume of the brake piston chamber. In the example of Equation (1) below, the hydraulic volume of brake fluid in the brake piston chamber, vol, is calculated based on a corresponding relationship to a change in pressure in the brake piston chamber over time, $$\frac{dP}{dt}.$$

Further, Equation (1) considers the flow rate of brake fluid, Q, an effective bulk modulus of the brake fluid, B, and an initial pressure at the beginning of the anti-lock braking event, $P_s$.

$$\frac{dP}{dt} = \frac{B \cdot Q}{vol} \text{ and } P(0) = P_s \quad \text{Equation (1)}$$

In FIG. 1, the brake wear controller 120 updates a wear coefficient associated with the brake pad 108 based on the thickness and/or the wear of the brake pad 108 in addition to material properties thereof.

In FIG. 1, in response to determining the braking event is not an anti-lock braking event the brake wear controller 120 determines a thickness and/or a wear of the brake pad 108 based on an Archard wear equation. For example, the brake wear controller 120 can estimate the thickness and/or the wear of the brake pad 108 based on the brake pad 108 wear coefficient, a contact pressure between the brake pad 108 and the brake rotor 118, and a sliding distance of the brake pad 108. In some examples, the brake wear controller 120 determines the contact pressure between the brake pad 108 and the brake rotor 118 based on a relationship between the pressure of the brake fluid in the brake line 106 and the contact pressure. In some examples, the brake wear controller 120 determines the sliding velocity of the brake pad 108 based on the magnetic field change induced by the brake rotor 118. In such examples, the brake wear controller 120 determines the sliding distance of the brake pad 108 based on the sliding velocity of the brake pad 108.

In FIG. 1, the brake wear controller 120 stores the thickness, the wear, and/or the wear coefficient of the brake pad 108. In some examples, the brake wear controller 120 transmits a signal to the display 128 in response to the wear of the brake pad 108 satisfying (e.g., being greater than) a predetermined wear threshold. In some examples, the brake wear controller 120 transmits a signal to the display in response to the thickness of the brake pad 108 satisfying (e.g., being less than) a predetermined thickness threshold. In some examples, the brake wear controller 120 transmits a status of the thickness and/or the wear of the brake pad 108 to the display 128.

Figure 2:
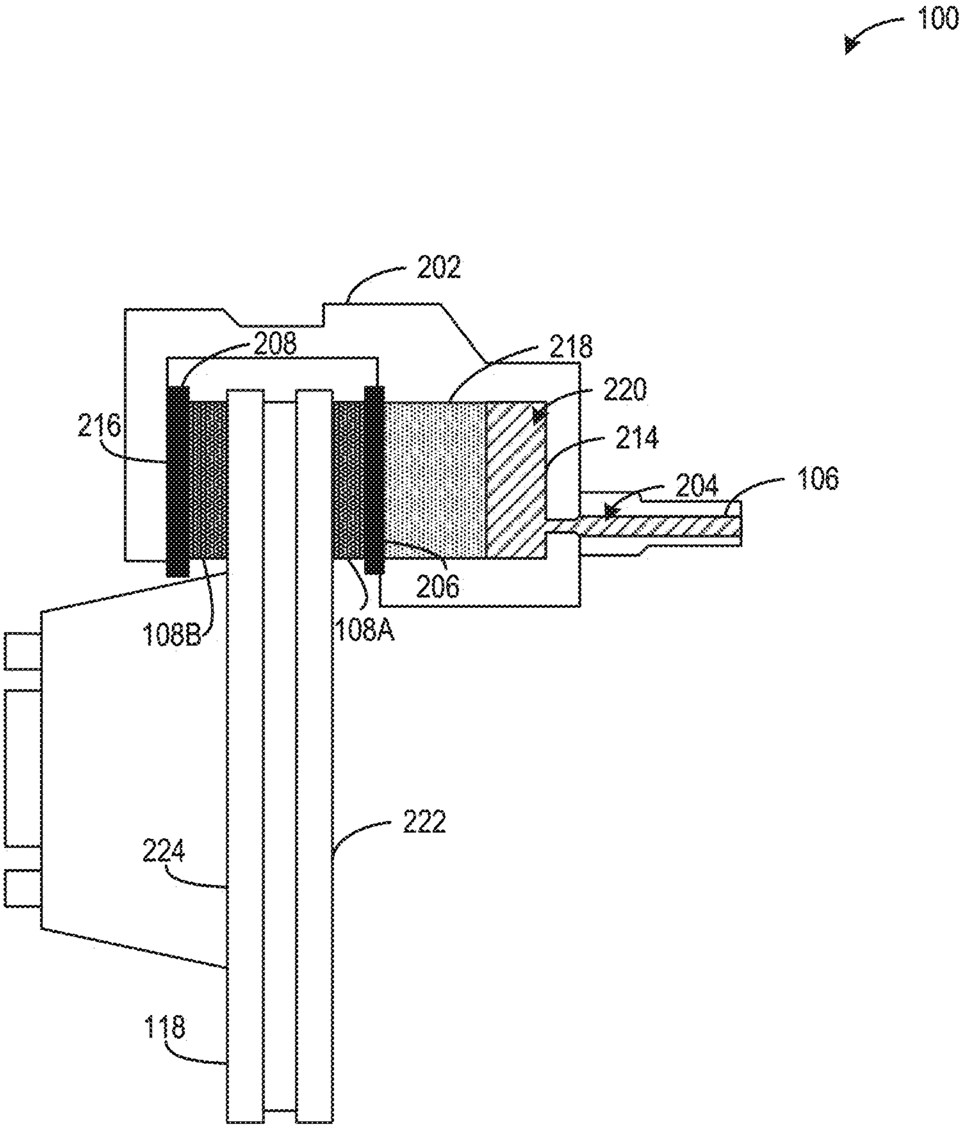
FIG. 2 illustrates the example braking system of FIG. 1.

FIG. 2 illustrates the example braking system 100 of FIG. 1. In FIG. 2, the braking system 100 includes a caliper 202, brake fluid 204, a first backing plate 206, a second backing plate 208, a first brake pad 108A, and a second brake pad 108B (e.g., the brake pad 108). In FIG. 2, the caliper 202 includes a first interior end 214 and a second interior end 216. In FIG. 2, the first interior end 214 of the caliper 202 includes a brake piston 218 positioned within a brake piston chamber 220. In FIG. 2, the braking system 100 further includes the brake line 106 and the brake rotor 118 of FIG. 1. In FIG. 2, the brake rotor 118 includes a first side 222 and a second side 224.

In FIG. 2, the caliper 202 is a floating caliper positioned around a portion of the brake rotor 118. Specifically, the first interior end 214 of the caliper 202 faces the first side 222 of the brake rotor 118 and the second interior end 216 of the caliper 202 faces the second side 224 of the brake rotor 118. In some other examples, the caliper 202 is a fixed caliper. In FIG. 2, the brake piston chamber 220 is operatively coupled to the brake line 106. In FIG. 2, the brake piston 218 is operatively coupled to the first backing plate 206. In FIG. 2, the first backing plate 206 is operatively coupled to the first brake pad 108A. In FIG. 2, the second backing plate 208 is operatively coupled to the second brake pad 108B.

In FIG. 2, when a braking event occurs, the brake master cylinder 104 of FIG. 1 drives the brake fluid 204 through the brake line 106 and into the brake piston chamber 220. As such, a pressure of the brake fluid 204 inside the brake piston chamber 220 causes the brake piston 218 to move the first backing plate 206 and, thus, the first brake pad 108A towards the first end 222 of the brake rotor 118. In turn, the pressure inside the brake piston chamber 220 and the contact between the first brake pad 108A and the first end 222 of the brake rotor 118 causes the second interior end 216 of the caliper 202 to slide towards the second side 224 of the brake rotor 118. As a result, the second brake pad 108B presses against the second side 224 of the brake rotor 118 as the first brake pad 108A presses against the first side 222 of the brake rotor 118, which generates friction forces that oppose a rotation of the brake rotor 118 and, thus, a speed of the vehicle.

In some examples, the first solenoid valve 112 opens and the second solenoid valve 114 closes to limit the pressure within the brake piston chamber 220, which prevents the wheel of the vehicle from slipping during an anti-lock braking event. In such examples, the pump 110 modulates the pressure inside the brake piston chamber 220 to brake the vehicle at a desired rate.

Figure 3:
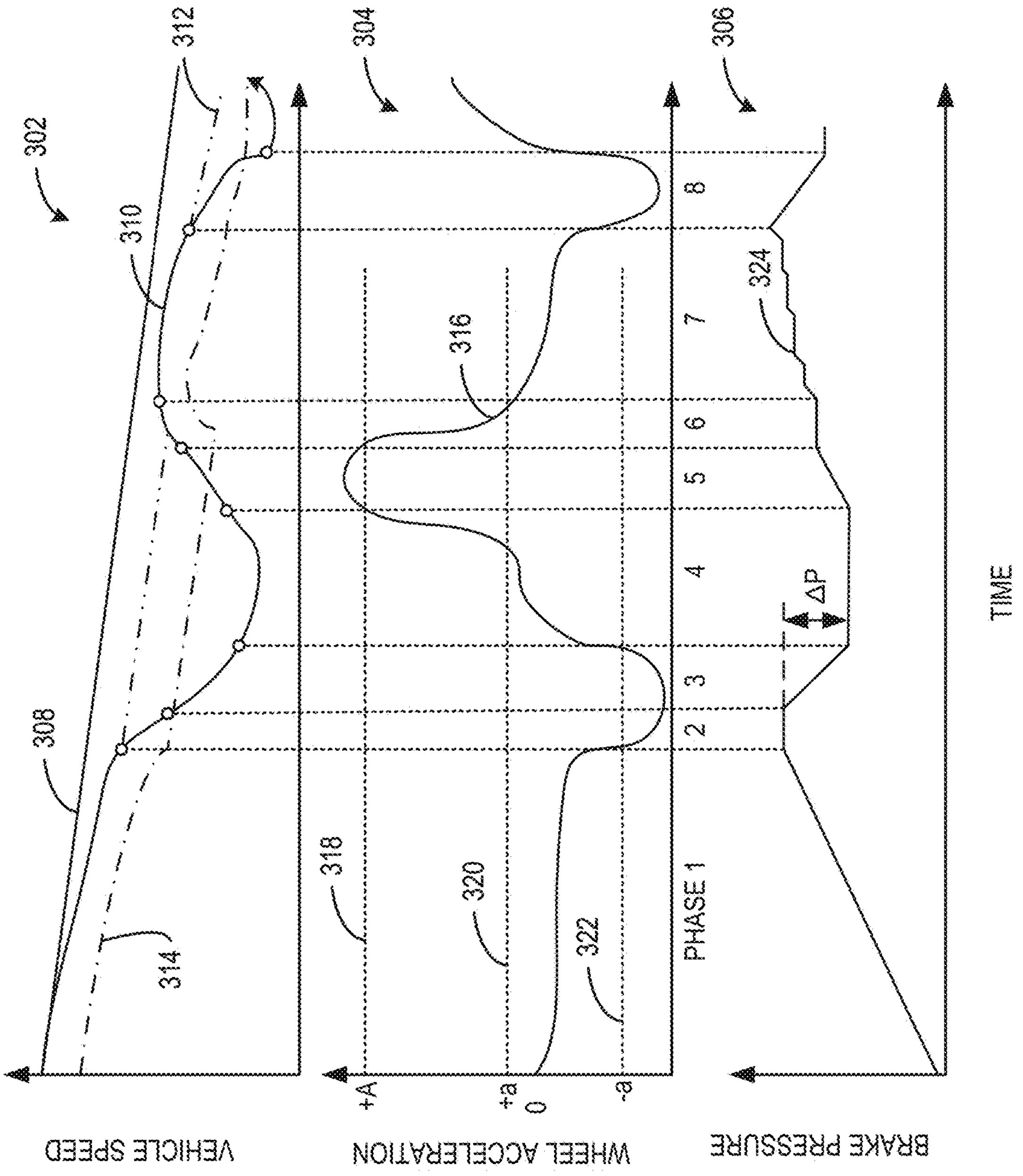
FIG. 3 illustrates example operations of the example braking system of FIGS. 1 and/or 2.

FIG. 3 illustrates a first graph 302, a second graph 304, and a third graph 306 representative of example operations of the braking system 100 of FIGS. 1 and/or 2 during anti-lock braking and/or non-anti-lock braking events. In FIG. 3, the first graph 302 includes a vehicle speed 308, a wheel speed 310, a reference speed 312, and a slip switching threshold 314. In FIG. 3, the second graph 304 includes a wheel acceleration (e.g., an angular acceleration of the brake rotor 118) 316, a first upper acceleration threshold 318, a second upper acceleration threshold 320, and a lower acceleration threshold 322. In FIG. 3, the third graph 306 includes a brake pressure 324. In FIG. 3, the first, second, and third graphs 302, 304, 306 include time on the x-axis, which is divided into phases 1-8.

In FIG. 3, the slip switching threshold 314 is based on the reference speed 312. In some examples, an anti-lock braking event occurs when the wheel acceleration 316 passes the lower acceleration threshold 322. In FIG. 3, the braking system 100 reduces a braking pressure (e.g., a pressure within the brake piston chamber 220) in response to the wheel speed 310 being less than the slip switching threshold 314, as shown in phase 3.

In FIG. 3, the braking system 100 increases the braking pressure in response to the wheel acceleration 316 being greater than the first upper acceleration threshold 318. In FIG. 3, the braking system 100 maintains the braking pressure in response to the wheel acceleration 316 being between the first upper acceleration threshold 318 and the second upper acceleration threshold 320. In FIG. 3, the braking system 100 responds to the reference speed 312 and, in turn, the slip switching threshold 314 based on the wheel acceleration 316.

In FIG. 3, the braking system 100 maintains or decreases the braking pressure in response to the wheel acceleration 316 being less than the lower acceleration threshold 322. In FIG. 3, the braking system 100 responds to the reference speed 312 and, in turn, the slip switching threshold 314 in response to the wheel acceleration 316 being less than the lower acceleration threshold 322.

Figure 4:
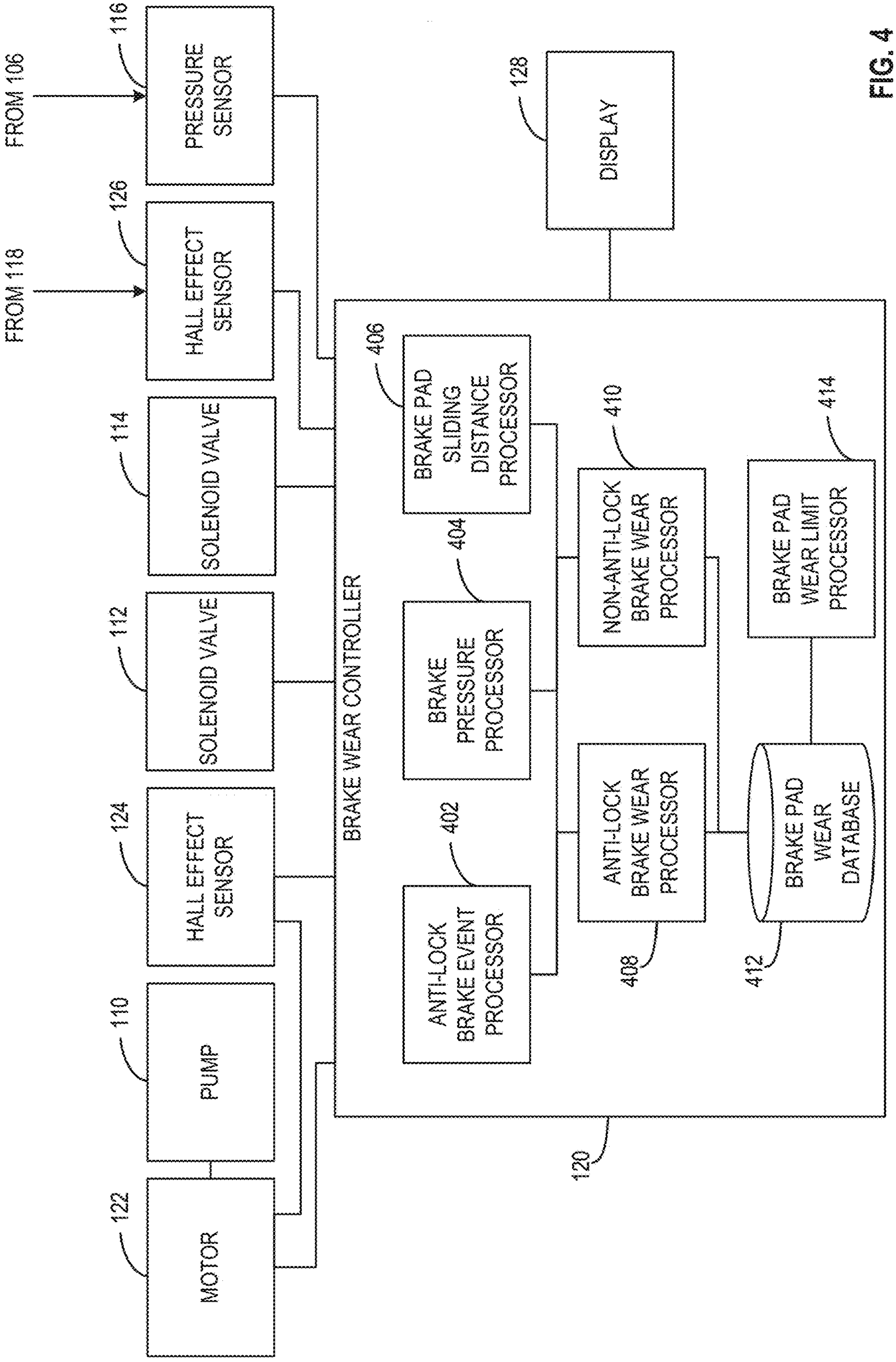
FIG. 4 is a block diagram of the example brake wear controller of FIG. 1.

FIG. 4 is a block diagram of the example brake wear controller 120 of the braking system 100 of FIG. 1. In FIG. 4, the braking system 100 includes the pump 110, the first solenoid valve 112, the second solenoid valve 114, the pressure sensor 116, the brake wear controller 120, the motor 122, the first Hall effect sensor 124, the second Hall effect sensor 126, and the display 128 of FIG. 1. In FIG. 4, the brake wear controller 120 includes an anti-lock brake event processor 402, a brake pressure processor 404, a brake pad sliding distance processor 406, an anti-lock brake wear processor 408, a non-anti-lock brake wear processor 410, a brake pad wear database 412, and a brake pad wear limit processor 414.

In FIG. 4, the anti-lock brake event processor 402 identifies a braking event of the braking system 100. In some examples, the anti-lock brake event processor 402 determines the brake pedal 102 is depressed and, thus, the vehicle is braking based on a pressure measurement of the pressure sensor 116. In some examples, the anti-lock brake event processor 402 determines the brake pedal 102 is depressed based on an angular velocity of the brake rotor 118. For example, the anti-lock brake event processor 402 can receive a signal indicative of a magnetic field measurement of the second Hall effect sensor 126, which corresponds to the angular velocity of the brake rotor 118.

In FIG. 4, the anti-lock brake event processor 402 determines whether the braking event is an anti-lock braking event or a non-anti-lock braking event based on a position and/or an activation of the first solenoid valve 112, the second solenoid valve 114, and/or the motor 122. In some examples, the anti-lock brake event processor 402 identifies an anti-lock braking event in response to the first solenoid valve 112 opening, the second solenoid valve 114 closing, and/or the motor 122 generating current to drive the pump 110. In such examples, the anti-lock brake event processor 402 transmits a signal indicating the anti-lock braking event to the anti-lock brake wear processor 408 in response to identifying the anti-lock braking event.

In some examples, the anti-lock brake event processor 402 identifies a non-anti-lock braking event in response to the first solenoid valve 112 being closed, the second solenoid valve 114 being open, and/or the motor 122 not generating current. In such examples, the anti-lock brake event processor 402 transmits a signal indicating the non-anti-lock braking event to the brake pressure processor 404, the brake pad sliding distance processor 406, and the non-anti-lock brake wear processor 410 in response to identifying the non-anti-lock braking event.

In FIG. 4, the brake pressure processor 404 determines a contact pressure between the brake pad 108 and the brake rotor 118 in response to receiving the signal indicating the non-anti-lock braking event. In some examples, the pressure sensor 116 measures the pressure of the brake fluid 204 in the brake line 106. In such examples, the brake pressure processor 404 can use the measurement from the pressure sensor 116 to determine the contact pressure between the brake pad 108 and the brake rotor 118. In FIG. 4, the brake pressure processor 404 transmits the contact pressure between the brake pad 108 and the brake rotor 118 to the non-anti-lock brake wear processor 410.

In FIG. 4, the brake pad sliding distance processor 406 determines a sliding distance between the brake pad 108 and the brake rotor 118 in response to receiving the signal indicating the non-anti-lock braking event. For example, the brake pad sliding distance processor 406 can determine the sliding distance of the brake pad 108 based on an angular velocity of the brake rotor 118 during the non-anti-lock braking event. In some examples, the brake pad sliding distance processor 406 determines the angular velocity of the brake rotor 118 based on the magnetic field measured by the second Hall effect sensor 126. In some other examples, the brake pad sliding distance processor 406 receives the angular velocity of the brake rotor 118 from another component associated with the vehicle. In FIG. 4, the brake pad sliding distance processor 406 transmits the sliding distance of the brake pad 108 to the non-anti-lock brake wear processor 410.

In FIG. 4, the anti-lock brake wear processor 408 determines a thickness and/or a wear of the brake pad 108 in response to receiving the signal indicating the anti-lock braking event. In FIG. 4, the anti-lock brake wear processor 408 determines the thickness and/or the wear of the brake pad 108 based on a volume of the brake fluid 204 inside the brake piston chamber 220 and a volume of the brake piston chamber 220. In FIG. 4, the anti-lock brake wear processor 408 determines the volume of brake fluid 204 inside the brake piston chamber 220 based on a flow rate of the brake fluid 204 and a pressure within the brake piston chamber 220. In some examples, the thickness and/or the wear of the brake pad 108 is based on an area of the brake piston 218.

In FIG. 4, the anti-lock brake wear processor 408 determines the flow rate of the brake fluid 204 based on a speed of the motor 122, which corresponds to an output of the pump 110. In some examples, the anti-lock brake wear processor 408 determines the speed of the motor 122 based on the back EMF of the motor 122. In some examples, the first Hall effect sensor 124 measures the magnetic field change induced by the rotor of the motor 122. In some examples, the anti-lock brake wear processor 408 determines the speed of the motor 122 based on the magnetic field change induced by the rotor of the motor 122. In some examples, the anti-lock brake wear processor 408 determines the speed of the motor based on information from other components associated with the braking system 102. In some examples, the flow rate of the brake fluid 204 is based on a displacement of the pump 110.

In FIG. 4, the anti-lock brake wear processor 408 determines the pressure within the brake piston chamber 220 based on the speed of the motor 122. In some examples, the anti-lock brake wear processor 408 determines the pressure within the brake piston chamber 220 based on a torque of the motor 122. In some examples, the anti-lock brake wear processor 408 receives a signal indicative of a stator current of the motor 122. In such examples, the anti-lock brake wear processor 408 determines the torque of the motor based the stator current of the motor 122 and a torque constant of the motor 122.

In FIG. 4, the anti-lock brake wear processor 408 determines and/or updates a wear coefficient of the brake pad 108 based on the thickness and/or the wear of the brake pad 108. In some examples, the wear coefficient of the brake pad 108 includes a nominal initial value based on material properties of the brake pad 108. In FIG. 4, the anti-lock brake wear processor 408 stores the thickness, the wear, and/or the wear coefficient of the brake pad 108 in the brake pad wear database 412.

In FIG. 4, the non-anti-lock brake wear processor 410 estimates the thickness and/or the wear of the brake pad 108 in response to receiving the signal indicating the non-anti-lock braking event. In FIG. 4, the non-anti-lock brake wear processor 410 estimates a change in the thickness (e.g., a wear) of the brake pad 108 based on the Archard wear equation. For example, the non-anti-lock brake wear processor 410 can estimate the change in the thickness of the brake pad 108 during a non-anti-lock braking event based on the brake pad 108 wear coefficient, the contact pressure between the brake pad 108 and the brake rotor 118, and the sliding distance of the brake pad 108. In some examples, the non-anti-lock brake wear processor 410 extracts the wear coefficient from the brake pad wear database 412. In FIG. 4, the non-anti-lock brake wear processor 410 transmits the wear of the brake pad 108 to the brake pad wear database 412.

In FIG. 4, the brake pad wear database 412 stores the thickness, the wear, and/or the wear coefficient of the brake pad 108. In some examples, the thickness, the wear, and/or the wear coefficient of the brake pad 108 are updated in the brake pad wear database 412 based on calculations from the anti-lock brake wear processor 408 and/or the non-anti-lock brake wear processor 410.

In FIG. 4, the brake pad wear limit processor 414 obtains the thickness and/or the wear of the brake pad 108 from the brake pad wear database 412. In FIG. 4, the brake pad wear limit processor 414 determines whether the brake pad 108 requires maintenance based on the thickness and/or the wear of the brake pad 108. For example, the brake pad wear limit processor 414 can compare the thickness and/or the wear of the brake pad 108 to a threshold thickness and/or wear that is associated with a reduction in braking capabilities. In some examples, the brake pad wear limit processor 414 determines the thickness of the brake pad 108 is associated with a reduction in braking capabilities in response to the thickness of the brake pad 108 satisfying (e.g., being less than) the threshold thickness. In some examples, the brake pad wear limit processor 414 determines the wear of the brake pad 108 is associated with a reduction in braking capabilities in response to the wear of the brake pad 108 satisfying (e.g., being greater than) the threshold wear. In some examples, the brake pad wear limit processor 414 determines the thickness and/or the wear of the brake pad 108 is healthy in response to the thickness and/or the wear of the brake pad not satisfying the thickness and/or the wear threshold.

In FIG. 4, the brake wear controller 120 transmits a brake wear alert signal to the display 128 in response to the thickness and/or the wear of the brake pad 108 satisfying the thickness and/or wear threshold. In some examples, the brake wear controller 120 transmits a healthy brake pad indication in response to the brake pad wear limit processor 414 determining the thickness and/or the wear of the brake pad is healthy. In some examples, the brake wear controller 120 transmits the thickness and/or the wear of the brake pad 108 to the display 128 based on data in the brake pad wear database 412.

In FIG. 4, the display 128 provides a brake pad wear alert (e.g., an audio alert, a visual alert, etc.) to the driver in response to receiving the brake wear alert signal from the brake wear controller 120. In some examples, the display 128 provides a healthy brake pad indication to the driver in response to receiving the healthy brake pad indication from the brake wear controller 120. In some examples, the display 128 provides the sensed thickness and/or wear measurement of the brake pad 108 to the driver, which enables the driver to determine whether to obtain and/or perform maintenance on the brake pad 108.

Figure 5:
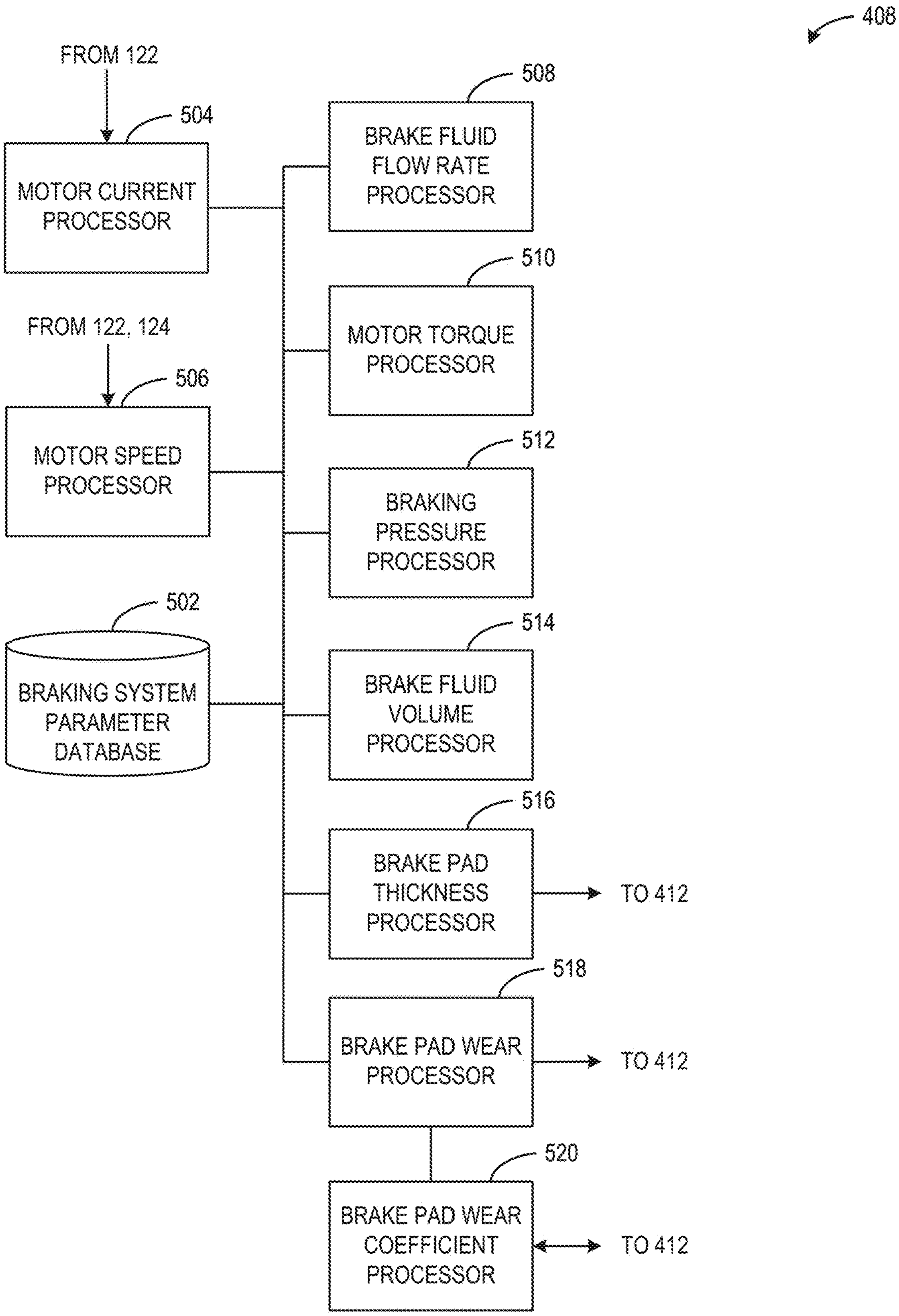
FIG. 5 is a block diagram of an example anti-lock brake wear processor of the example brake wear controller of FIGS. 1 and/or 4.

FIG. 5 is a block diagram of the anti-lock brake wear processor 408 of the example braking system 100 of FIGS. 1, 2, and/or 4. In FIG. 5, the anti-lock brake wear processor 408 includes a braking system parameter database 502, a motor current processor 504, a motor speed processor 506, a brake fluid flow rate processor 508, a motor torque processor 510, a braking pressure processor 512, a brake fluid volume processor 514, a brake pad thickness processor 516, a brake pad wear processor 518, and a brake pad wear coefficient processor 520.

In FIG. 5, the braking system parameter database 502 stores predetermined parameters associated with the braking system 100. In some examples, the braking system parameter database 502 includes a torque constant associated with the motor 122 and/or a viscous frictional coefficient associated with the motor 122. In some examples, the braking system parameter database 502 includes an initial volume of the brake piston chamber 220, a cross-sectional area of the piston 218, an effective bulk modulus of the brake fluid, and/or an initial thickness of the brake pad 108. In some examples, the braking system parameter database 502 includes a displacement of the pump 110 and/or a rotary inertia of the pump 110 and the motor 122.

In FIG. 5, the motor current processor 504 determines a stator current of the motor 122. In some examples, the motor current processor 504 receives from the motor 122 a signal indicative of the stator current. In such examples, the motor current processor 504 determines the stator current based on the signal from the motor 122. In FIG. 5, the motor current processor 504 transmits the stator current of the motor 122 to the motor torque processor 510.

In FIG. 5, the motor speed processor 506 determines a speed (e.g., a rotational speed, an angular velocity) of the motor 122. In some examples, the motor speed processor 506 receives from the first Hall effect sensor 124 a signal indicative of the speed of the motor 122. In some examples, the motor speed processor 506 receives a signal from the motor 122 indicative of an electrical current of the motor, which corresponds to the speed of the motor 122. For example, the motor 122 generates a back EMF that varies the current through the motor based on the speed of the motor 122. In FIG. 5, the motor speed processor 506 transmits the speed of the motor 122 to the brake fluid flow rate processor 508 and the motor torque processor 510.

In FIG. 5, brake fluid flow rate processor 508 determines a flow rate of the brake fluid 204. In some examples, the brake fluid flow rate processor 508 identifies the displacement of the pump 110 in the braking system parameter database 502. In some examples, the brake fluid flow rate processor 508 determines the flow rate of the brake fluid 204 based on the displacement of the pump 110 and the speed of the motor 122. In FIG. 5, the brake fluid flow rate processor 508 transmits the flow rate of the brake fluid 204 to the brake fluid volume processor 514.

In FIG. 5, the motor torque processor 510 determines a torque of the motor 122. In some examples, the motor torque processor 510 identifies the torque constant of the motor 122 via the braking system parameter database 502. In some examples, the motor torque processor 510 determines the torque of the motor 122 based on the stator current of the motor 122 and the torque constant of the motor 122

In FIG. 5, the braking pressure processor 512 determines a change in pressure across the pump 110. In some examples, the braking pressure processor 512 identifies predetermined parameters associated with the pump 110 and/or the motor 122 via the braking system parameter database 502. For example, the braking pressure processor 512 can identify the torque constant of the motor 122, the viscous frictional coefficient of the motor 122, the displacement of the pump 110, and the rotary inertia of the pump 110 and the motor 122. In FIG. 5, the braking pressure processor 512 determines the change in pressure across the pump 110 based on the speed of the motor 122, the torque of the motor 122, and the predetermined parameters associated with the pump 110 and/or the motor 122. In the example of Equation (2) below, the change in pressure across the pump, $\Delta P_{pump}$, is calculated based on a corresponding relationship to the torque of the motor 122, $\tau_m$. Further, Equation (2) below considers the pump displacement, $C_0$, the viscous frictional coefficient of the motor 122, $B_m$, the speed of the motor 122, $\omega_m$, the rotary inertia of the motor 122 and pump 110, $J_m$, and a change in the speed of the motor 122 over time, $$\frac{d\omega_m}{dt}.$$

$$\tau_m = \frac{C_0}{2\pi} \cdot \Delta P_{pump} + B_m \omega_m + J_m \frac{d\omega_m}{dt} \qquad \text{Equation (2)}$$

In some examples, the braking pressure processor 512 uses Equation (2) to determine the change in pressure across the pump 110. In some examples, the braking pressure processor 512 determines the pressure inside the brake piston chamber 220 based on the change in pressure across the pump 110. In FIG. 5, the braking pressure processor 512 transmits the pressure inside the brake piston chamber 220 to the brake fluid volume processor 514.

In FIG. 5, the brake fluid volume processor 514 determines a volume of brake fluid 204 in the brake piston chamber 220 during the anti-lock braking event. In some examples, the brake fluid volume processor 514 identifies the effective bulk modulus of the brake fluid via the braking system parameter database 502. In some examples, the brake fluid volume processor 514 determines the volume of brake fluid 204 in the brake piston chamber 220 based on the effective bulk modulus of the brake fluid, the flow rate of the brake fluid 204, and the pressure inside the brake piston chamber 220 using Equation (1). In FIG. 5, the brake fluid volume processor 514 transmits the volume of brake fluid 204 in the brake piston chamber 220 to the brake pad thickness processor 516.

In FIG. 5, the brake pad thickness processor 516 determines a thickness of the brake pad 108 (e.g., the first brake pad 108A and/or the second brake pad 108B). In some examples, the brake pad thickness processor identifies the cross-sectional area of the brake piston 218 and the initial volume of the brake piston chamber 220 via the braking system parameter database 502. In FIG. 5, the brake pad thickness processor 516 determines the thickness of the brake pad 108 based on the volume of brake fluid 204 in the brake piston chamber 220, the cross-sectional area of the brake piston 218, and the initial volume of the brake piston chamber 220. In FIG. 5, the brake pad thickness processor 516 transmits the thickness of the brake pad 108 to the brake pad wear processor 518 and/or the brake pad wear database 412 of FIG. 4.

In FIG. 5, the brake pad wear processor 518 determines a wear of the brake pad 108. In some examples, the brake pad wear processor 518 identifies the initial thickness of the brake pad 108 via the braking system parameter database 502. In FIG. 5, the brake pad wear processor 518 determines the wear of the brake pad 108 based on a difference between the thickness of the brake pad 108 and the initial thickness of the brake pad 108. In FIG. 5, the brake pad wear processor 518 transmits the wear of the brake pad 108 to the brake pad wear coefficient processor 520 and/or the brake pad wear database 412.

In FIG. 5, the brake pad wear coefficient processor 520 determines the wear coefficient of the brake pad 108. In some examples, the brake pad wear coefficient processor 520 identifies a most recent wear coefficient of the brake pad 108 and/or material properties of the brake pad 108 via the brake pad wear database 412. In some examples, the brake pad wear coefficient processor 520 updates the wear coefficient of the brake pad 108 based on the wear of the brake pad 108.

While an example manner of implementing the brake wear controller 120 of FIGS. 1, 4, and/or 5 is illustrated in FIGS. 4 and/or 5, one or more of the elements, processes and/or devices illustrated in FIGS. 4 and/or 5 may be combined, divided, re-arranged, omitted, eliminated and/or implemented in any other way. Further, the example pump 110, the example first solenoid valve 112, the example second solenoid valve 114, the example pressure sensor 116, the example motor 122, the example first Hall effect sensor 124, the example second Hall effect sensor 126, the example display 128, the example anti-lock brake event processor 402, the example brake pressure processor 404, the example brake pad sliding distance processor 406, the example anti-lock brake wear processor 408, the example non-anti-lock brake wear processor 410, the example brake pad wear database 412, the example brake pad wear limit processor 414, the example braking system parameter database 502, the example motor current processor 504, the example motor speed processor 506, the example brake fluid flow rate processor 508, the example motor torque processor 510, the example braking pressure processor 512, the example brake fluid volume processor 514, the example brake pad thickness processor 516, the example brake pad wear processor 518, the example brake pad wear coefficient processor 520, and/or, more generally, the example brake wear controller 120 of FIGS. 1, 4, and/or 5 may be implemented by hardware, software, firmware and/or any combination of hardware, software and/or firmware. Thus, for example, any of the example pump 110, the example first solenoid valve 112, the example second solenoid valve 114, the example pressure sensor 116, the example motor 122, the example first Hall effect sensor 124, the example second Hall effect sensor 126, the example display 128, the example anti-lock brake event processor 402, the example brake pressure processor 404, the example brake pad sliding distance processor 406, the example anti-lock brake wear processor 408, the example non-anti-lock brake wear processor 410, the example brake pad wear database 412, the example brake pad wear limit processor 414, the example braking system parameter database 502, the example motor current processor 504, the example motor speed processor 506, the example brake fluid flow rate processor 508, the example motor torque processor 510, the example braking pressure processor 512, the example brake fluid volume processor 514, the example brake pad thickness processor 516, the example brake pad wear processor 518, the example brake pad wear coefficient processor 520, and/or, more generally, the example brake wear controller 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example pump 110, the example first solenoid valve 112, the example second solenoid valve 114, the example pressure sensor 116, the example motor 122, the example first Hall effect sensor 124, the example second Hall effect sensor 126, the example display 128, the example anti-lock brake event processor 402, the example brake pressure processor 404, the example brake pad sliding distance processor 406, the example anti-lock brake wear processor 408, the example non-anti-lock brake wear processor 410, the example brake pad wear database 412, the example brake pad wear limit processor 414, the example braking system parameter database 502, the example motor current processor 504, the example motor speed processor 506, the example brake fluid flow rate processor 508, the example motor torque processor 510, the example braking pressure processor 512, the example brake fluid volume processor 514, the example brake pad thickness processor 516, the example brake pad wear processor 518, the example brake pad wear coefficient processor 520, and/or the example brake wear controller 120 is/are hereby expressly defined to include a non-transitory computer readable storage device or storage disk such as a memory, a digital versatile disk (DVD), a compact disk (CD), a Blu-ray disk, etc. including the software and/or firmware. Further still, the example brake wear controller 120 of FIGS. 1, 4, and/or 5 may include one or more elements, processes and/or devices in addition to, or instead of, those illustrated in FIGS. 4 and/or 5, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
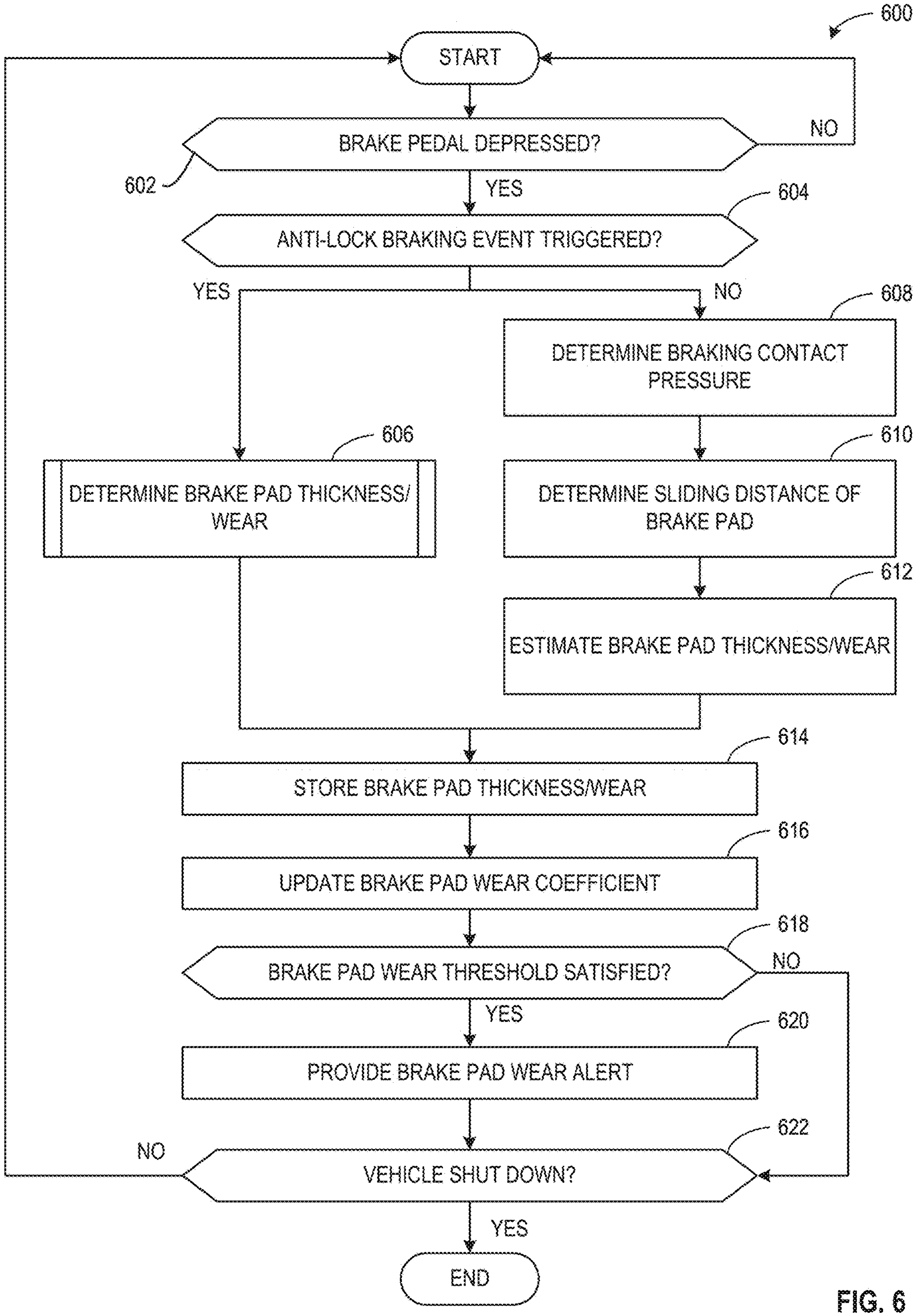
FIG. 6 is a flowchart representative of machine readable instructions which may be executed to implement the example brake wear controller of FIGS. 1, 4, and/or 5.

A flowchart representative of example hardware logic, machine readable instructions, hardware implemented state machines, and/or any combination thereof for implementing the brake wear controller of FIGS. 4 and/or 5 is shown in FIGS. 6 and/or 7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6 and/or 7, many other methods of implementing the example brake wear controller 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6 and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of machine readable instructions 600 which may be executed to implement the example brake wear controller 120 of FIGS. 1, 4, and/or 5. At block 602, the brake wear controller 120 determines whether the brake pedal 102 of FIG. 1 is depressed. For example, the anti-lock brake event processor 402 of FIG. 4 can determine if the brake pedal 102 is depressed and, thus, if a braking event is occurring based on a pressure of the brake fluid 204 in the brake line 106. In some examples, the pressure sensor 116 of FIGS. 1 and/or 4 measures the pressure of the brake fluid 204 in the brake line 106. In some examples, the anti-lock brake event processor 402 determines if the brake pedal is depressed based on a magnetic field of the brake rotor 118. In such examples, the second Hall effect sensor 126 can measure the magnetic field of the rotor 118. In some examples, the brake wear controller 120 receives a signal indicative of the brake pedal 102 being depressed from other components associated with the braking system 100. In some examples, the machine readable instructions 600 restart in response to the brake wear controller 120 determining the brake pedal 102 is not depressed. In some examples, the machine readable instructions 600 continue to block 604 in response to the brake wear controller determining the brake pedal 102 is depressed.

At block 604, the brake wear controller 120 determines whether an anti-lock braking event is triggered. For example, the anti-lock brake event processor 402 can determine whether the anti-lock braking event is triggered based on an operation of the first solenoid valve 112, the second solenoid valve 114, and/or the motor 122 of FIG. 1. In some examples, the anti-lock brake event processor 402 identifies the anti-lock braking event in response to the first solenoid valve 112 opening, the second solenoid valve 114 closing, and/or the motor 122 generating current to drive the pump 110. In some examples, the anti-lock brake event processor 402 transmits a signal indicating the anti-lock braking event to the anti-lock brake wear processor 408 in response to the first solenoid valve 112 opening, the second solenoid valve 114 closing, and/or the motor 122 generating current. In some examples, the anti-lock brake event processor 402 transmits a signal indicating a non-anti-lock brake event to the brake pressure processor 404, the brake pad sliding distance processor 406, and/or the non-anti-lock brake wear processor 410 of FIG. 4 in response to the first solenoid valve 112 being closed, the second solenoid valve 114 being open, and/or the motor 122 not generating current. In some examples, the machine readable instructions 600 proceed to block 606 in response to the brake wear controller 120 determining the anti-lock braking event is triggered. In some examples, the machine readable instructions 600 proceed to block 608 in response to the brake wear controller 120 determining the anti-lock braking event is not triggered.

At block 606, the brake wear controller 120 determines a thickness and/or a wear of the brake pad 108 of FIGS. 1 and/or 2. For example, the anti-lock brake wear processor 408 of FIGS. 4 and/or 5 can determine the thickness and/or the wear of the brake pad 108, as discussed further in association with FIG. 7. In some examples, the machine readable instructions 600 proceed to block 614 in response to the anti-lock brake wear processor 408 determining the thickness and/or the wear of the brake pad 108.

At block 608, the brake wear controller 120 determines a braking contact pressure between the brake pad 108 and the brake rotor 118 of FIG. 1. For example, the brake pressure processor 404 can determine the contact pressure between the brake pad 108 and the brake rotor 118 based on a predetermined relationship between the contact pressure and the pressure measurement of the pressure sensor 116. In some examples, the brake pressure processor 404 transmits the braking contact pressure to the non-anti-lock brake wear processor 410.

At block 610, the brake wear controller 120 determines a sliding distance of the brake pad 108. For example, the brake pad sliding distance processor 406 can determine the sliding distance of the brake pad 108 based on an angular velocity of the brake rotor 118 during the non-anti-lock braking event. In some examples, the brake pad sliding distance processor 406 determines the angular velocity of the brake rotor 118 based on a magnetic field measured by the second Hall effect sensor 126 of FIGS. 1 and/or 4. In some examples, the brake pad sliding distance processor 406 receives the angular velocity of the brake rotor 118 from another component of the vehicle. In some examples, the brake pad sliding distance processor 406 transmits the sliding distance of the brake pad 108 to the non-anti-lock brake wear processor 410.

At block 612, the brake wear controller 120 estimates the thickness and/or the wear of the brake pad 108. For example, the non-anti-lock brake wear processor 410 can estimate the thickness and/or the wear of the brake pad 108 based on the Archard wear equation. In some examples, the non-anti-lock brake wear processor 410 estimates a change in the thickness of the brake pad 108 based on the brake pad 108 wear coefficient, the contact pressure between the brake pad 108 and the brake rotor 118, and the sliding distance of the brake pad 108.

At block 614, the brake wear controller 120 stores the thickness and/or the wear of the brake pad 108. For example, the anti-lock brake wear processor 408 can store the determined thickness and/or wear of the brake pad 108 in the brake pad wear database 412. In some examples, the non-anti-lock brake wear processor 410 stores the estimated thickness and/or wear of the brake pad 108 in the brake pad wear database 412.

At block 616, the brake wear controller 120 updates the wear coefficient of the brake pad 108. For example, the anti-lock brake wear processor 408 can update the wear coefficient in the brake pad wear database 412 based on the determined thickness, wear and/or the material properties of the brake pad 108. In some examples, the brake pad wear coefficient processor 520 of FIG. 5 updates the brake pad wear coefficient based on the thickness and/or wear of the brake pad in response to an anti-lock braking event.

At block 618, the brake wear controller 120 determines whether a brake pad wear threshold is satisfied. For example, the brake pad wear limit processor 414 can obtain the thickness and/or the wear of the brake pad 108 from the brake pad wear database 412. Further, the brake pad wear limit processor 414 can compare the thickness of the brake pad 108 to a threshold thickness and/or compare the wear of the brake pad 108 to a threshold wear. In some examples, the brake pad wear limit processor 414 determines the brake pad wear threshold is satisfied in response to the thickness of the brake pad 108 satisfying (e.g., being less than) the threshold thickness and/or the wear of the brake pad 108 satisfying (e.g., being greater than) the threshold wear. In some examples, the machine readable instructions 600 proceed to block 620 in response to the brake pad wear threshold being satisfied. In some examples, the machine readable instructions 600 proceed to block 622 in response to the brake pad wear threshold not being satisfied.

At block 620, the brake wear controller 120 provides a brake pad wear alert to the driver. For example, the brake wear controller 120 can transmit a signal indicative of the brake pad wear alert to the display 128. In some examples, the display 128 provides a brake pad wear notification (e.g., an audio alert, a visual alert, etc.) to the driver.

At block 622, the brake wear controller 120 determines whether the vehicle is shut down. For example, the anti-lock brake event processor 402 can determine whether the first solenoid valve 112, the second solenoid valve 114, and/or the motor 122 are receiving power, which indicates the vehicle is running. In some examples, the machine readable instructions 600 restart in response to the vehicle not being shut down. In some examples the machine readable instructions 600 are terminated in response to the vehicle being shut down.

Figure 7:
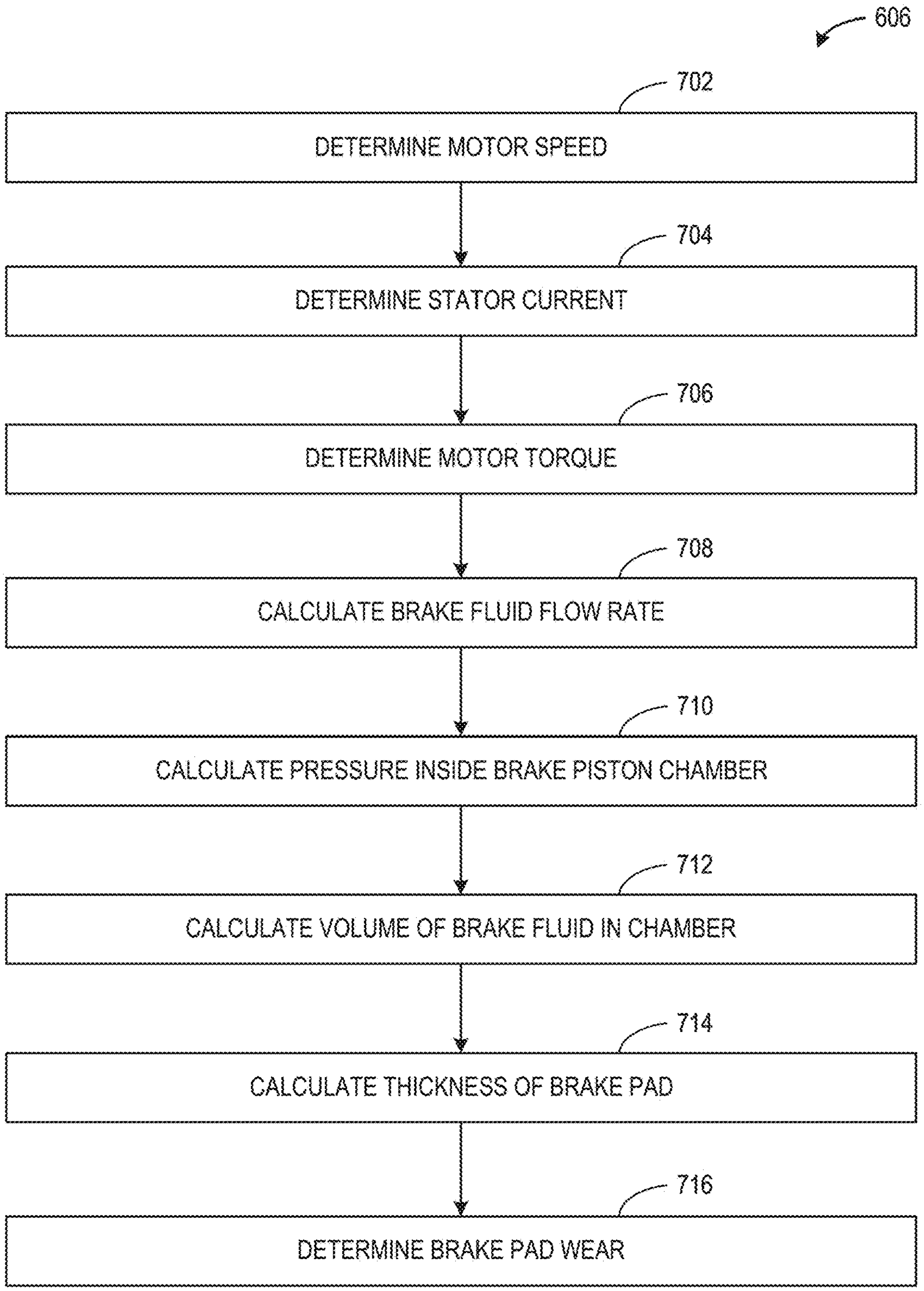
FIG. 7 is a flowchart representative of machine readable instructions which may be executed to implement the example anti-lock brake wear processor of FIGS. 4 and/or 5.

FIG. 7 is a flowchart representative of machine readable instructions 606 which may be executed to implement the example anti-lock brake wear processor 408 of FIGS. 4 and/or 5. At block 702, the anti-lock brake wear processor 408 determines a speed of the motor 122. In some examples, the motor speed processor 506 can determine the speed of the motor 122 via a Hall effect sensor 124 associated with the motor 122. For example, the motor speed processor 506 of FIG. 5 can receive a signal indicative of the magnetic field associated with the motor 122 from the first Hall effect sensor 124. In some examples, the motor speed processor 506 receives a signal from the motor 122 indicative of an electrical current of the motor, which corresponds to the speed of the motor 122. For example, the motor 122 generates a back EMF that varies the current through the motor based on the speed of the motor 122. In FIG. 5, the motor speed processor 506 transmits the speed of the motor 122 to the brake fluid flow rate processor 508, the motor torque processor 510, and the braking pressure processor 512 of FIG. 5.

At block 704, the anti-lock brake wear processor 408 determines a stator current associated with the motor 122. For example, the motor current processor 504 of FIG. 5 can determine the stator current of the motor 122 based on a signal indicative of the stator current from the motor 122. In some examples, the motor current processor 504 transmits the stator current of the motor 122 to the motor torque processor 510.

At block 706, the anti-lock brake wear processor 408 determines a torque of the motor 122. For example, the motor torque processor can determine the torque of the motor 122. In some examples, the motor torque processor 510 identifies the torque constant of the motor 122 via the braking system parameter database 502. In such examples, the motor torque processor 510 determines the torque of the motor 122 based on the stator current of the motor 122, and the torque constant of the motor 122. In some examples, the motor torque processor 510 transmits the torque of the motor 122 to the braking pressure processor 512.

At block 708, the anti-lock brake wear processor 408 calculates a flow rate of the brake fluid 204. For example, the brake fluid flow rate processor 508 can determine a flow rate of the brake fluid 204 based on the displacement of the pump 110 and the speed of the motor 122. In some examples, the brake fluid flow rate processor 508 identifies the displacement of the pump via the braking system parameter database 502. In some examples, the brake fluid flow rate processor 508 transmits the flow rate of the brake fluid 204 to the brake fluid volume processor 514 of FIG. 5.

At block 710, the anti-lock brake wear processor 408 calculates a pressure inside the brake piston chamber 220. For example, the braking pressure processor 512 can determine the pressure inside the brake piston chamber 220 based on the speed of the motor 122, the torque of the motor 122, and predetermined parameters associated with the pump 110 and/or the motor 122. In some examples, the braking pressure processor 512 identifies the predetermined parameters associated with the pump 110 and/or the motor 122 via the braking system parameter database 502. In some examples, the braking pressure processor 512 transmits the pressure inside the brake piston chamber 220 to the brake fluid volume processor 514.

At block 712, the anti-lock brake wear processor 408 calculates a volume of brake fluid in the brake piston chamber 220. For example, the brake fluid volume processor 514 can determine the volume of brake fluid 204 in the brake piston chamber 220 based on the flow rate of the brake fluid 204 and the pressure inside the brake piston chamber 220. In some examples, the brake fluid volume processor 514 transmits the volume of the brake fluid 204 in the brake piston chamber 220 to the brake pad thickness processor 516 of FIG. 5.

At block 714, the anti-lock brake wear processor 408 calculates the thickness of the brake pad 108. For example, the brake pad thickness processor 516 can determine the thickness of the brake pad 108 based on the volume of brake fluid 204 in the brake piston chamber 220, the cross-sectional area of the brake piston 218, and the initial volume of the brake piston chamber 220. In some examples, the brake pad thickness processor 516 identifies the cross-sectional area of the brake piston 218 via the braking system parameter database 502. In some examples, the brake pad thickness processor transmits the thickness of the brake pad 108 to the brake pad wear processor 518. In some examples, the anti-lock brake wear processor 408 updates the thickness of the brake pad 108 in the brake pad wear database 412.

At block 716, the anti-lock brake wear processor 408 determines a wear of the brake pad 108. For example, the brake pad wear processor 518 can determine the wear of the brake pad 108 based on the thickness of the brake pad 108 and an initial thickness of the brake pad 108. In some examples, the brake pad wear processor 518 identifies the initial thickness of the brake pad 108 via the braking system parameter database 502. In some examples, the anti-lock brake wear processor 408 updates the wear of the brake pad 108 in the brake pad wear database 412

Figure 8:
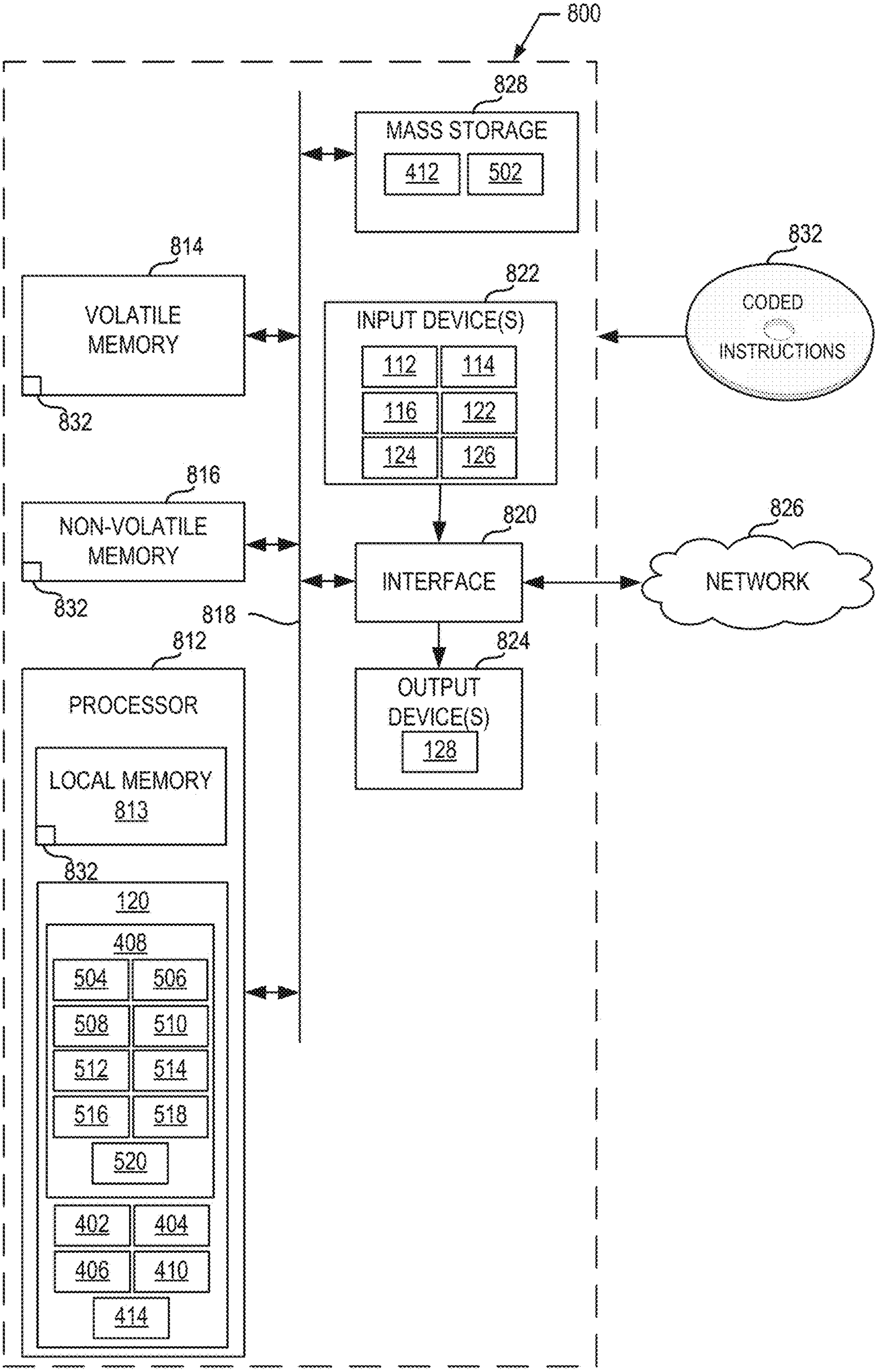
FIG. 8 is a block diagram of an example processing platform structured to execute the instructions of FIGS. 6 and/or 7 to implement the example brake wear controller of FIGS. 1, 4, and/or 5.

FIG. 8 is a block diagram of an example processor platform 800 structured to execute the instructions of FIGS.

6 and/or 7 to implement the brake wear controller 120 of FIGS. 1, 4, and/or 5. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the brake wear controller 120, the anti-lock brake event processor 402, the brake pressure processor 404, the brake pad sliding distance processor 406, the anti-lock brake wear processor 408, the non-anti-lock brake wear processor 410, the brake pad wear limit processor 414, the motor current processor 504, the motor speed processor 506, the brake fluid flow rate processor 508, the motor torque processor 510, the braking pressure processor 512, the brake fluid volume processor 514, the brake pad thickness processor 516, the brake pad wear processor 518, and the brake pad wear coefficient processor 520.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(s) include the first solenoid valve 112, the second solenoid valve 114, the pressure sensor 116, the motor 122, the first Hall effect sensor 124, and the second Hall effect sensor 126.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor. In this example the output devices include the display 128.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In this example, the mass storage devices 828 include the brake pad wear database 412 and the braking system parameter database 502.

The machine executable instructions 832 of FIGS. 6 and/or 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that dynamically determine a brake pad wear. The example methods, apparatus and articles of manufacture utilize predetermined parameters associated with the components of the braking system and measurements from sensors onboard the vehicle to virtually determine the brake pad wear. The example methods, apparatus and articles of manufacture can alert the driver of the brake pad wear to prevent non-ideal braking situations and/or damage to the vehicle. In turn, the driver can maintain awareness of the health status of the vehicle and schedule vehicle maintenance accordingly, which can reduce overall maintenance costs and improve operations of the vehicle. The predetermined parameters and/or onboard sensors are often utilized in existing vehicles and, as a result, the example methods, apparatus, and articles of manufacture can be implemented in existing vehicles with minimal integration costs.

Example methods, apparatus, systems, and articles of manufacture to dynamically determine brake pad wear are disclosed herein. Further examples and combinations thereof include the following:

Example 1 includes an apparatus comprising at least one memory device, and at least one processor to execute instructions to, in response to an anti-lock braking event determine a volume of brake fluid in a brake piston chamber based on a flow rate of the brake fluid and a pressure within the brake piston chamber, and determine at least one of a thickness of a brake pad or a wear of the brake pad based on the volume of the brake fluid in the brake piston chamber and a volume of the brake piston chamber.

Example 2 includes the apparatus of example 1, wherein the at least one processor is to determine a speed of a motor, the motor to control a brake fluid pump.

Example 3 includes the apparatus of example 2, wherein the at least one processor is to determine the flow rate of the brake fluid based on the speed of the motor.

Example 4 includes the apparatus of example 2, wherein the at least one processor is to determine the pressure within the brake piston chamber based on the speed of the motor.

Example 5 includes the apparatus of example 1, wherein the at least one processor is to determine the thickness of the brake pad or the wear of the brake pad based on a brake pad wear coefficient, a sliding distance of the brake pad relative to a brake rotor, and a contact pressure between the brake pad and the brake rotor in response to the anti-lock braking event not being triggered.

Example 6 includes the apparatus of example 1, wherein the at least one processor determines a brake pad wear coefficient based on the thickness of the brake pad or the wear of the brake pad.

Example 7 includes the apparatus of example 1, wherein the pressure within the brake piston chamber corresponds to the volume of brake fluid in the brake piston chamber and the flow rate of the brake fluid.

Example 8 includes a method to dynamically determine brake pad wear comprising determining, in response to an anti-lock braking event, a volume of a brake fluid in a brake piston chamber based on a flow rate of the brake fluid and a pressure inside the brake piston chamber, and determining at least one of a thickness of a brake pad or a wear of the brake pad based on the volume of the brake fluid in the brake piston chamber and a volume of the brake piston chamber.

Example 9 includes the method of example 8, further including identifying a volume of the brake piston chamber in response to the anti-lock braking event.

Example 10 includes the method of example 8, further including determining a speed of a motor, the motor to control the flow rate of the brake fluid.

Example 11 includes the method of example 10, further including determining the flow rate of the brake fluid based on the speed of the motor.

Example 12 includes the method of example 10, further including determining the pressure inside the brake piston chamber based on the speed of the motor.

Example 13 includes the method of example 8, wherein the pressure inside the brake piston chamber corresponds to the volume of the brake fluid in the brake piston chamber and the flow rate of the brake fluid.

Example 14 includes the method of example 8, further including determining at least one of the thickness of the brake pad or the wear of the brake pad based on a brake pad wear coefficient, a sliding distance of the brake pad relative to a brake rotor, and a contact pressure between the brake pad and the brake rotor in response to the anti-lock braking event not being triggered.

Example 15 includes the method of example 8, further including updating a brake pad wear coefficient based on the thickness of the brake pad or the wear of the brake pad in response to the anti-lock braking event being triggered.

Example 16 includes an apparatus to dynamically determine brake pad wear in a vehicle comprising a memory, and a brake wear controller to identify a status of a braking event, determine a volume of brake fluid in a brake piston chamber based on a flow rate of the brake fluid and a pressure inside the brake piston chamber, and determine at least one of a brake pad thickness or a brake pad wear based on the volume of brake fluid in the brake piston chamber and a volume of the brake piston chamber.

Example 17 includes the apparatus of example 16, further including a pump and at least one solenoid valve to control the flow rate of the brake fluid.

Example 18 includes the apparatus of example 17, further including a motor to control the pump.

Example 19 includes the apparatus of example 18, further including at least one sensor to determine a speed of the motor.

Example 20 includes the apparatus of example 19, wherein the brake wear controller is to determine the flow rate of the brake fluid and the pressure inside the brake piston chamber based on the speed of the motor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:

at least one memory device; and at least one processor to execute instructions to:

determine whether a braking event corresponds to an anti-lock braking event or a non-anti-lock braking event;

in response to the braking event corresponding to the anti-lock braking event, determine at least one of a thickness of a brake pad or a wear of the brake pad based on at least operating parameters of a motor associated with pumping a brake fluid, wherein the operating parameters of the motor correspond to a pressure within a brake piston chamber and a flow rate of the brake fluid; and in response to the braking event corresponding to the non-anti-lock braking event, determine at least one of the thickness or the wear based on at least a first measurement from a rotary sensor operatively coupled to a brake rotor and a second measurement from a pressure sensor operatively coupled to a flow path of the brake fluid.

2. The apparatus of claim 1, wherein, in response to the braking event being the non-anti-lock braking event, the at least one processor is to determine at least one of the thickness or the wear based on a brake pad wear coefficient.

3. The apparatus of claim 1, wherein the first measurement corresponds to a sliding velocity of the brake pad relative to the brake rotor during the non-anti-lock braking event, and wherein the second measurement corresponds to a contact pressure between the brake pad and the brake rotor during the non-anti-lock braking event.

4. The apparatus of claim 1, wherein the rotary sensor includes one or more Hall effect sensors.

5. The apparatus of claim 1, wherein the operating parameters of the motor include a stator current of the motor and at least one of an angular velocity of the motor or a back electromotive force of the motor.

6. The apparatus of claim 1, wherein the at least one processor is to determine whether the braking event corresponds to the anti-lock braking event or the non-anti-lock braking event based on a configuration of at least one solenoid valve.

7. The apparatus of claim 1, wherein the at least one processor is to determine the braking event corresponds to the anti-lock braking event when the motor generates current.

8. A method comprising:

in response to a braking event corresponding to an anti-lock braking event:

determining a pressure within a brake piston chamber based on a first parameter of operating parameters of a motor;

determining a flow rate of a brake fluid based on a second parameter of the operating parameters of the motor; and determining at least one of a thickness of a brake pad or a wear of the brake pad based on at least one of the operating parameters of the motor associated with pumping the brake fluid; and in response to the braking event corresponding to a non-anti-lock braking event, determining at least one of the thickness or the wear based on at least a first measurement from a rotary sensor operatively coupled to a brake rotor and a second measurement from a pressure sensor operatively coupled to a flow path of the brake fluid.

9. The method of claim 8, wherein, in response to the braking event corresponding to the non-anti-lock braking event, the determining of at least one of the thickness or the wear includes:

determining a sliding distance of the brake pad during the non-anti-lock braking event based on the first measurement; and determining a braking contact pressure during the non-anti-lock braking event based on the second measurement.

10. The method of claim 8, wherein the first parameter is a stator current of the motor, and wherein the second parameter is an angular velocity or a back electromotive force of the motor.

11. The method of claim 8, further including determining the braking event corresponds to the anti-lock braking event in response to a first solenoid valve opening and a second solenoid valve closing.

12. The method of claim 11, further including determining the braking event corresponds to the anti-lock braking event in response to the motor pumping the brake fluid.

13. The method of claim 8, further including updating a brake pad wear coefficient based on at least one of the thickness or the wear in response to braking event corresponding to either of the anti-lock braking event or the non-anti-lock braking event, and wherein, in response to the braking event corresponding to the non-anti-lock braking event, the determining of at least one of the thickness or the wear is based on the brake pad wear coefficient.

14. A non-transitory machine readable storage medium comprising instructions to cause programmable circuitry to at least:

determine whether a braking event is an anti-lock braking event or a non-anti-lock braking event;

when the braking event is the anti-lock braking event, determine at least one of a thickness of a brake pad or a wear of the brake pad based on at least operating parameters of a motor associated with pumping a brake fluid, wherein the operating parameters of the motor correspond to a pressure within a brake piston chamber and a flow rate of the brake fluid; and when the braking event is the non-anti-lock braking event, determine at least one of the thickness or the wear based on a first measurement from a rotary sensor operatively coupled to a brake rotor and a second measurement from a pressure sensor operatively coupled to a flow path of the brake fluid.

15. The non-transitory machine readable storage medium of claim 14, wherein the instructions cause the programmable circuitry to determine at least one of the thickness or the wear based on a brake pad wear coefficient when the braking event is the non-anti-lock braking event.

16. The non-transitory machine readable storage medium of claim 14, wherein the first measurement corresponds to a sliding velocity of the brake pad relative to the brake rotor during the non-anti-lock braking event, and wherein the second measurement corresponds to a contact pressure between the brake pad and the brake rotor during the non-anti-lock braking event.

17. The non-transitory machine readable storage medium of claim 14, wherein the instructions cause the programmable circuitry to determine whether the braking event corresponds to the anti-lock braking event or the non-anti-lock braking event based on a configuration of at least one solenoid valve.

* * * * *